(12) United States Patent  
Yang

(10) Patent No.: US 8,731,774 B2  
(45) Date of Patent: May 20, 2014

(54) SYSTEMS, METHODS, AND COMPUTER-READABLE MEDIA FOR CONTROLLING SUSPENSION OF VEHICLE

(71) Applicant: Hyundai Motor Company, Seoul (KR)

(72) Inventor: Woo Sung Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/680,678

(22) Filed: Nov. 19, 2012

(65) Prior Publication Data

US 2013/0261893 A1    Oct. 3, 2013

(30) Foreign Application Priority Data

Apr. 2, 2012    (KR) .................. 10-2012-0033698

(51) Int. Cl.  
*B60G 17/018*    (2006.01)

(52) U.S. Cl.  
USPC ............................................. 701/38; 701/40

(58) Field of Classification Search  
USPC ...................................................... 701/38, 40  
See application file for complete search history.

(56) References Cited

U.S. PATENT DOCUMENTS

2006/0293817 A1* 12/2006 Hagiwara et al. ............... 701/40

* cited by examiner

*Primary Examiner* — Mary Cheung  
*Assistant Examiner* — Yuen Wong  
(74) *Attorney, Agent, or Firm* — Edwards Wildman Palmer LLP; Peter F. Corless

(57) ABSTRACT

The present invention provides systems, methods, and computer-readable media for controlling a suspension for a vehicle in which a platform model and a suspension model are provided and a first neural oscillator model and a second neural oscillator model that feed back an output to each model to acquire displacements of the platform model and the suspension model from displacements inputted into a tire, acquire feedbacks of the first neural oscillator model and the second neural oscillator model from the displacements of the platform model and the suspension model, and acquire pressing force required in the suspension for the vehicle from the feedback of the second neural oscillator model.

7 Claims, 3 Drawing Sheets

SYSTEMS, METHODS, AND COMPUTER-READABLE MEDIA FOR CONTROLLING SUSPENSION OF VEHICLE

CROSS-REFERENCE TO RELATED APPLICATION

This application claims under 35 U.S.C. §119(a) the benefit of Korean Patent Application No. 10-2012-0033698, filed Apr. 2, 2012. The entire contents of this application are incorporated herein by reference.

TECHNICAL FIELD

The present disclosure relates to a method for controlling a suspension of a vehicle according to a control algorithm based on a neural oscillator associated with passive-active type vibration reduction.

BACKGROUND

A vehicle suspension control technology in the related art was diversified, but an example in which a neural vibrator concept is applied to a relevant control algorithm could not be found.

SUMMARY OF THE DISCLOSURE

The present invention has been made in an effort to solve the above-described problems associated with prior art.

The present invention has been made in an effort to provide a method for controlling a suspension for a vehicle that can reduce oscillation of a vehicle to a predetermined amplitude range even though a state of a road surface is changed.

An exemplary embodiment of the present invention provides a method for controlling a suspension for a vehicle in which a platform model and a suspension model expressed by virtual mass-spring-damper models are provided and a first neural oscillator model and a second neural oscillator model that feed back an output to each model to acquire displacements of the platform model and the suspension model from displacements inputted into a tire, acquire feedbacks of the first neural oscillator model and the second neural oscillator model from the displacements of the platform model and the suspension model, and acquire pressing force required in the suspension for the vehicle from the feedback of the second neural oscillator model.

The platform model and the suspension model can be expressed by an equations below:

$$m_r \ddot{x}_t + c_r \dot{x}_t + (k_t + k_c) x_t - k_c x_s = k_{o1} x_{o1}$$

$$m_s \ddot{x}_s + c_s \dot{x}_s + k_c x_t - (k_s + k_c) x_s = k_{o2} x_{o2}$$

Parameters $m_t$, $c_t$, $k_r$, and $x_t$ represents mass, a damping coefficient, a spring constant, and a displacement of the platform model, $m_s$, $c_s$, $k_s$, and $x_s$ represent mass a damping coefficient, a spring constant, and a displacement of the suspension model, $x_{o1}$ and $x_{o2}$ represent feedbacks of first and second neural oscillator models, and $k_{o1}$, $k_{o2}$, and k represent predetermined coefficients for expressing the displacements as force.

Each of the first neural oscillator model and the second neural oscillator model can feed back a cyclic signal by an extensor neuron and a flexor neuron as shown in an equation below.

$$T_r \dot{x}_{ei} + x_{ei} = -w_{fi} y_{fi} - \sum_{j=1}^{n} w_{ij} y_j - b v_{ei} - \sum k_i [g_i]^+ + s_i$$

$$T_a \dot{v}_{ei} + v_{ei} = y_{ei} \quad y_{ei} = [x_{ei}]^+$$
$$= \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+$$
$$= \max(x_{fi}, 0),$$

where, $T_r$ and $T_a$ represent time constants, $w_f$, $w_e$, and $w_i$ represent suppressor gains, b represents an adaptation constant, $g_i$ represents an input displacement, $S_i$ represents an external stimulus input, and $k_i$ represents a feedback gain.

The displacement of the platform model can be inputted into the first neural oscillator model, the feedback of the first neural oscillator model and the displacement of the suspension model can be inputted into the second neural oscillator model, and the pressing force required for the suspension of the vehicle can be acquired from the feedback of the second neural oscillator model.

The feedback of the second neural oscillator model can be inputted into the first neural oscillator model together with the displacement of the platform model.

Another exemplary embodiment of the present invention provides a method for controlling a suspension for a vehicle, including: a displacement process of acquiring displacements of a platform model and a suspension model from displacements inputted from the platform model and the suspension model expressed by virtual mass-spring-damper models into a tire; a first input process of inputting the displacement of the platform model into a first neural oscillator model that feeds back an output to the platform model; a second input process of inputting the feedback of the first neural oscillator model and the displacement of the suspension model to a second neural oscillator model that feeds back the output to the suspension model; and a deduction process of acquiring pressing force required for the suspension of the vehicle from the feedback of the second neural oscillator model.

Further, the deduction process can further include an inter-input process of inputting the feedback of the second neural oscillator model into the first neural oscillator model together with the displacement of the platform model.

According to a method for controlling a suspension for a vehicle having the above structure, oscillation inputted from a road surface when a vehicle travels is automatically reduced and the vehicle is robust to an environment by maintaining predetermined performance in spite of diversified oscillation patterns.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Another aspect of the invention provides a system for controlling a suspension for a vehicle. The system includes: a controller programmed to implement a platform model, a suspension model, a first neural oscillator model, and a second neural oscillator model. The platform model and the suspension model are expressed by virtual mass-spring-damper models. The first neural oscillator model and the second neural oscillator model feed back an output to each model to: acquire displacements of the platform model and the suspension model from displacements inputted into a tire; acquire feedbacks of the first neural oscillator model and the second neural oscillator model from the displacements of the platform model and the suspension model; and acquire pressing force required in the suspension for the vehicle from the feedback of the second neural oscillator model.

This aspect of the invention can have a variety of embodiments. The displacements inputted into the tire can be modeled by a sine wave. The platform model can be expressed by equation $$m_t \ddot{x}_t + c_t \dot{x}_t + (k_t + k_c) x_t - k_c x_s = k_{o1} x_{o1} + kA \sin wt$$

and the suspension model can be expressed by equation $$m_s \ddot{x}_s + c_s \dot{x}_s + k_c x_t - (k_s + k_c) x_s = k_{o2} x_{o2}$$

where $m_t$, $C_t$, $k_t$, and $x_t$ represent mass, a damping coefficient, a spring constant, and a displacement of the platform model, respectively, $m_s$, $c_s$, $k_5$, and $x_i$ represent mass, a damping coefficient, a spring constant, and a displacement of the suspension model, respectively, $x_{o1}$ and $x_{o2}$ represent feedbacks of the first neural oscillator model and the second neural oscillator model, respectively, and $k_{o1}$, $k_{o2}$, and k represent predetermined coefficients for expressing the displacements as force.

Each of the first neural oscillator model and the second neural oscillator model can feed back a cyclic signal by an extensor neuron and a flexor neuron in accordance with equations $$T_r \dot{x}_{ei} + x_{ei} = -w_{fi} y_{fi} - \sum_{j=1}^{n} w_{ij} y_j - b v_{ei} - \sum k_i [g_i]^+ + s_i$$

$$T_a \dot{v}_{ei} + v_{ei} = y_{ei} \quad y_{ei} = [x_{ei}]^+$$
$$= \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+$$
$$= \max(x_{fi}, 0),$$

where $T_r$ and $T_a$ represent time constants, $w_f$, $w_e$, and $w_i$ represent suppressor gains, b represents an adaptation constant, $g_i$ represents an input displacement, $S_i$ represents an external stimulus input, and $k_i$ represents a feedback gain.

The displacement of the platform model can be inputted into the first neural oscillator model, the feedback of the first neural oscillator model and the displacement of the suspension model can be inputted into the second neural oscillator model, and the pressing force required for the suspension of the vehicle can be acquired from the feedback of the second neural oscillator model.

The feedback of the second neural oscillator model can be inputted into the first neural oscillator model together with the displacement of the platform model.

Another aspect of the invention provides a method for controlling a suspension for a vehicle. The method includes: acquiring displacements of a platform model and a suspension model from displacements inputted from the platform model and the suspension model expressed by virtual mass-spring-damper models into a tire; inputting the displacement of the platform model into a first neural oscillator model that feeds back an output to the platform model; inputting the feedback of the first neural oscillator model and the displacement of the suspension model to a second neural oscillator model that feeds back the output to the suspension model; and acquiring pressing force required for the suspension of the vehicle from the feedback of the second neural oscillator model.

This aspect of the invention an have a variety of embodiments. The step of acquiring pressing force further can include inputting the feedback of the second neural oscillator model into the first neural oscillator model together with the displacement of the platform model.

Another aspect of the invention provides a non-transitory computer readable medium containing program instructions executed by a processor or controller. The computer readable medium includes: program instructions that acquire displacements of a platform model and a suspension model from displacements inputted from the platform model and the suspension model expressed by virtual mass-spring-damper models into a tire; program instructions that input the displacement of the platform model into a first neural oscillator model that feeds back an output to the platform model; program instructions that input the feedback of the first neural oscillator model and the displacement of the suspension model to a second neural oscillator model that feeds back the output to the suspension model; and program instructions that acquire pressing force required for the suspension of the vehicle from the feedback of the second neural oscillator model.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
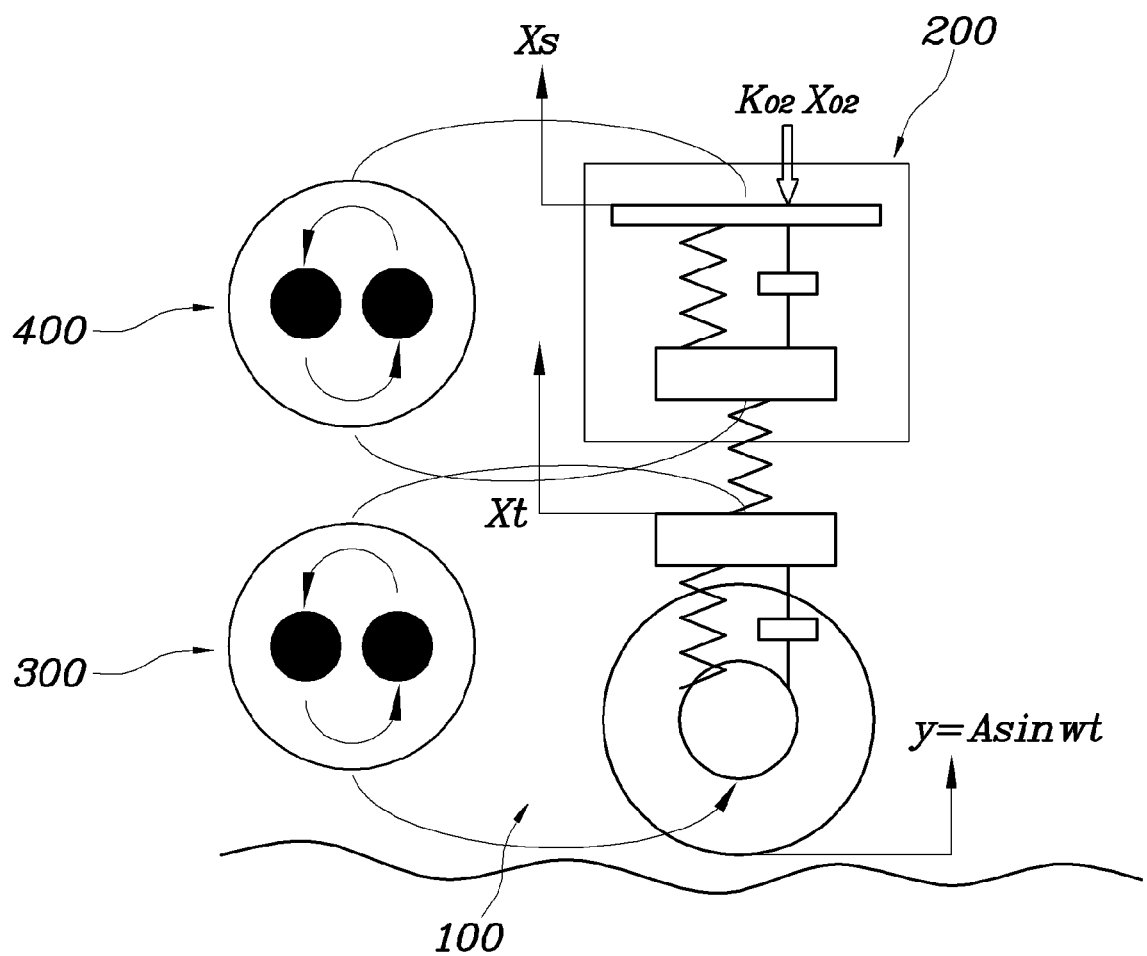
FIG. 1 is a diagram showing a system adopting a method for controlling a suspension for a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

The neural oscillator concept will first be simply described. A nucleus of an automatic movement and a conditional/unconditional reflex movement of a spinal animal is known as spinal nerves. Repeated movements such as our diversified movements, for example, walking, running, and breathing and all other unperceived movements are most managed by a nerve group.

The nerve group is called a central pattern generator (CPG) and a largest reason causing the automatic movement is an automatic cycle synchronization function with the outside, which is called entrainment implicit in the CPG. Therefore, when the function is used as an algorithm for removing diversified oscillations inputted from a road surface while a vehicle travels, a large effect in which oscillation is automatically included within a predetermined amplitude by the entrainment function is achieved.

In the present invention, two neural controllers are configured in a model in which one wheel shaft of the vehicle is simply configured and two neural oscillators are configured by a virtual coupling or configured by a self-neural network in order to limit oscillation of the vehicle within a predetermined range of amplitude regardless of a state of the road surface by using the control concept of the neural oscillator.

In this case, when two neural oscillators are synchronized to an oscillation cycle inputted into tires and suspensions and control respective oscillations in one cycle by the coupling or network. In this case, a final output shows an oscillation amount reduced to a predetermined rate (approximately 50%) in respective levels under predetermined diversified environmental states.

Hereinafter reference will now be made in detail to various embodiments of the present invention, examples of which are illustrated in the accompanying drawings and described below.

Hereinafter, a method for controlling a suspension for a vehicle according to an exemplary embodiment of the present invention will be described with reference to the accompanying drawings.

FIG. 1 is a diagram showing a system adopting a method for controlling a suspension for a vehicle according to an exemplary embodiment of the present invention and the method for controlling a suspension for a vehicle according to the exemplary embodiment of the present invention can be implemented by providing a platform model 100 and a suspension model 200, connecting a first neural oscillator model 300 and a second neural oscillator model 400 that feed back an output to each model, acquiring displacements of the platform model 100 and the suspension model 200 from displacements inputted into a tire, acquiring feedbacks of the first neural oscillator model 300 and the second neural oscillator model 400 from the displacements of the platform model 100 and the suspension model 200, and acquiring pressing force required in the suspension for the vehicle from the feedback of the second neural oscillator model 400.

In detail, as shown in FIG. 1, a lower part of the vehicle can be generally constituted by a platform and a suspension. A tire is included in the platform. An excitation force y=A sin(wt) is applied to the tire according to a condition of the road surface and transferred through the platform and the suspension and a damping performance of an active suspension is actively controlled according to an excitation situation to thereby achieve optimal ride comfort and stably achieve a behavior of the vehicle.

The active suspension accurately judges the excitation situation, and as a result, can use a neural oscillator as a technical means for accurately controlling the abilities of the spring and the damper.

Meanwhile, in the control of the suspension of the vehicle, while the platform and the suspension are stored through simple mathematical modeling, a control unit controls the suspension by calculating the pressing force, thereby continuously maintaining a degree of the amplitude transferred to the vehicle within a predetermined range by actively controlling the pressing force even though the excitation situation of the road surface varies.

The platform model 100 of the vehicle can be expressed by mass, a spring constant, and a damping coefficient. Similarly, the suspension model 200 is also expressed by the mass, the spring constant, and the damping coefficient. In addition, both systems can be networked through a virtual spring constant.

By designing neural oscillators that mutually feed back in the respective models, the models can be expressed by an equation implemented on a controller. A central pattern generator (CPG) configured by a neural oscillator network that is present within a spinal nerve of an organism manages a cyclic automatic movement and thus, human and animals can perform walking, swimming, flying, and breathing without particular recognition. The movements show shapes of surprised automatic movements that self correspond while an external environment is changed. This occurs because the movement is, in general, automatically controlled by sensory information that feeds back from a movement neuron. The neural oscillator model basically generates a cyclic signal by an inter-suppression action of flexor and extensor neurons and the cyclic signal is changed in coincidence with sensory feedback in which a change is sensed. This is called an 'entrainment' feature of the neural oscillator.

The system for controlling a suspension for a vehicle includes the platform model 100 and the suspension model 200 expressed by a virtual mass-spring-damper model and connects the first neural oscillator model 300 and the second neural oscillator model 400 that feed back the output to each model. In addition, displacements $x_t$ and $x_s$ of the platform model and the suspension model are acquired from a displacement A sin(wt) inputted into the tire.

Feedbacks $x_{o1}$ and $x_{o2}$ of the first neural oscillator model 300 and the second neural oscillator model 400 are acquired from the acquired displacements $x_t$ and $x_s$ of the platform model 100 and the suspension model 200. In addition, pressing force $k_{o2xo2}$ required for the suspension of the vehicle is acquired from the feedback $x_{o2}$ of the second neural oscillator model to find an important result associated with the control of the suspension. To this end, the displacement inputted into the tire is preferably modeled as a sine wave A sin(wt).

Meanwhile, the platform model and the suspension model can be modeled to be expressed by an equation below.

$$m_t \ddot{x}_t + c_t \dot{x}_t + (k_t + k_c) x_t - k_c x_s = k_{o1} x_{o1} + kA \sin wt \quad \text{[Equation 1]}$$

$$m_s \ddot{x}_s + c_s \dot{x}_s + k_c x_t - (k_s + k_c) x_s = k_{o2} x_{o2} \quad \text{[Equation 2]}$$

where $m_t$, $C_t$, $k_t$, and $x_t$ represents mass, a damping coefficient, a spring constant, and a displacement of the platform model, respectively, $m_s$, $c_s$, $k_5$, and $x_s$ represent mass a damping coefficient, a spring constant, and a displacement of the suspension model, respectively, $x_{o1}$ and $x_{o2}$ represent feedbacks of first and second neural oscillator models, respectively, and $k_{o1}$, $k_{o2}$, and k represent predetermined coefficients for expressing the displacements as force.

Equation 1 above is an equation of the platform model 100 and Equation 2 is an equation of the suspension model 200. Each of the platform model 100 and the suspension model 200 is expressed by the virtual mass-spring-damper and both models are configured to be connected through a spring constant $k_c$. In addition, the first neural oscillator model 300 and the second neural oscillator model 400 are connected to the respective models, such that the first neural oscillator model 300 can feed back the output $x_{o1}$ to the platform model 100 with the displacement $x_t$ of the platform model 100 as an input and the second neural oscillator model 400 can feed back the output $x_{o2}$ to the suspension model receiving the outputs $x_{o1}$ and $x_s$ of the first neural oscillator model and the suspension models Of course, the excitation situation kA sin(wt) depending on the road surface is applied to the platform model 100 and the first neural oscillator model 300 can also feed back $x_{o2}$ by receiving the output $x_{o2}$ of the second neural oscillator model 400 together.

Figure 2:
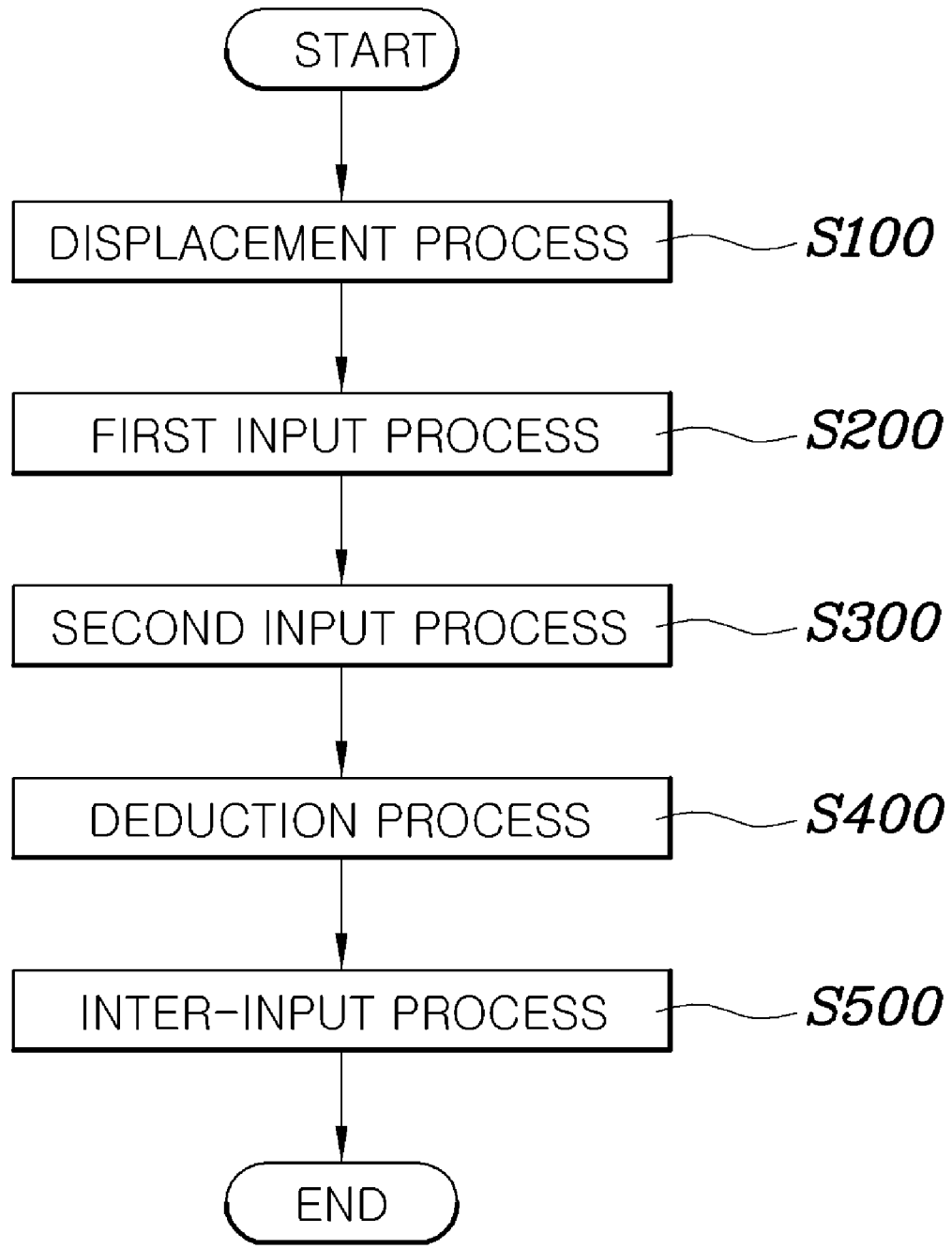
FIG. 2 is a diagram schematically showing a concept of a neural oscillator used in the method for controlling a suspension for a vehicle according to the exemplary embodiment of the present invention.

FIG. 2 is a diagram schematically showing a concept of a neural oscillator used in the method for controlling a suspension for a vehicle according to the exemplary embodiment of the present invention. Each of the first neural oscillator model 300 and the second neural oscillator model 400 feeds back the cyclic signal by the inter-suppression action of the extensor neuron and the flexor neuron as shown in an equation below.

$$T_r \dot{x}_{ei} + x_{ei} = -w_{fi} y_{fi} - \sum_{j=1}^{n} w_{ij} y_j - b v_{ei} - \sum k_i [g_i]^+ + s_i \quad \text{[Equation 3]}$$

$$T_a \dot{v}_{ei} + v_{ei} = y_{ei} \quad y_{ei} = [x_{ei}]^+$$
$$= \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+$$
$$= \max(x_{fi}, 0),$$

where $T_r$ and $T_a$ represent time constants, $w_f$, $w_e$, and $w_i$ represent suppressor gains, b represents an adaptation constant, $g_i$ represents an input displacement, $S_i$ represents an external stimulus input, and $k_i$ represents a feedback gain.

Figure 3:
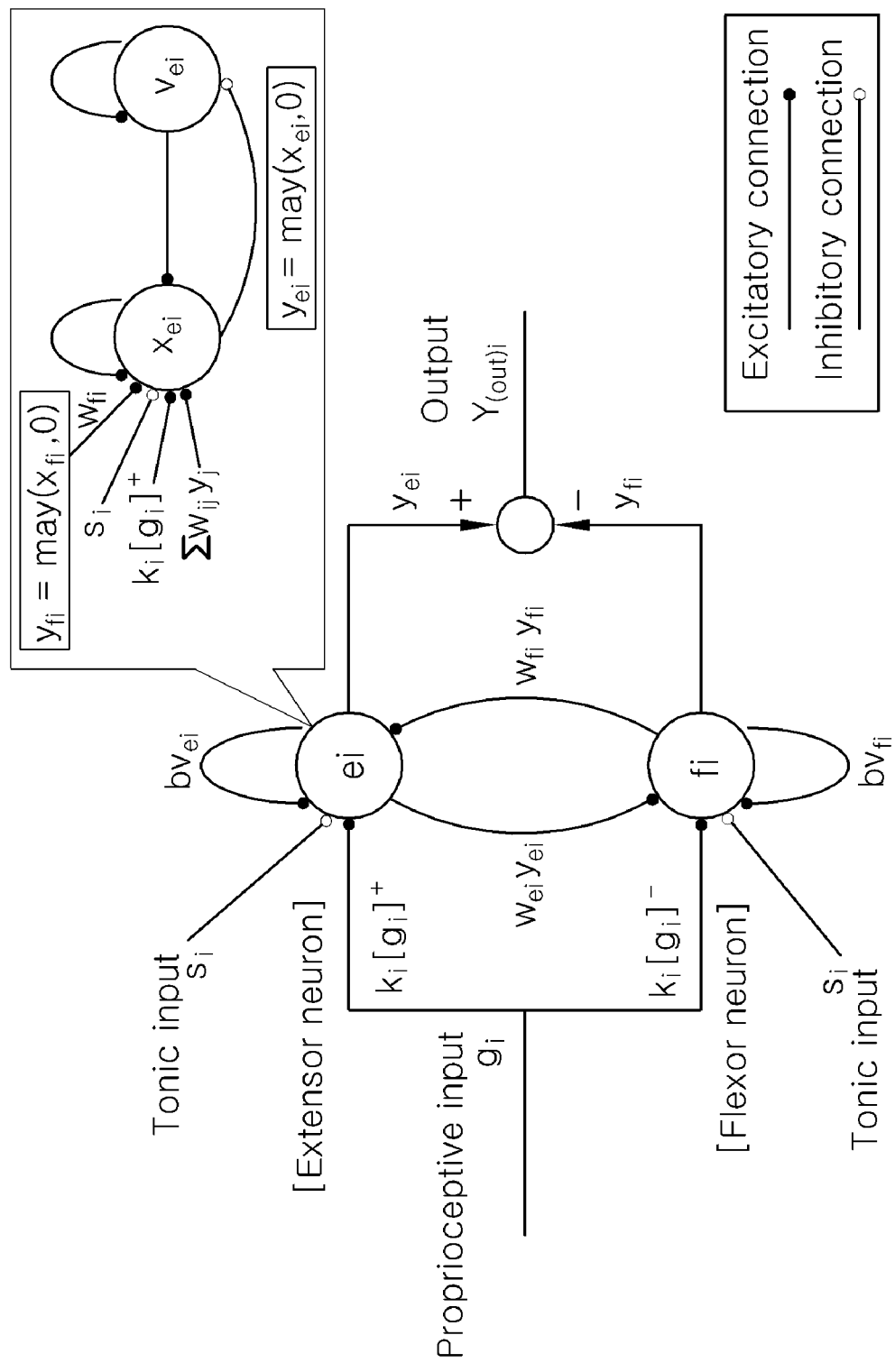
FIG. 3 is a flowchart of a method for controlling a suspension for a vehicle according to an exemplary embodiment of the present invention.

As shown in FIG. 3, one neural oscillator model can be designed as neurons $e_i$ and $f_i$ serving as two inter-suppressors. The two neurons function as an extensor $e_i$ and a flexor $f_i$ and displacement gi is equivalently inputted as an input ($K_i[g_i]$). In addition, an external stimulus input (tonic input $s_i$) such as a predetermined signal generated from a brain is inputted into each neuron and values by suppressor gains ($w_f$ and $w_i$) refer to each other ($w_f y_f$). The respective values are, by themselves, influenced by an adaptation constant b. When two neural oscillators are inter-networked to each other, feedbacks ($w_{ij} y_i$) of different neural oscillator model are inputted as in the present invention.

Through such a process, an output $Y_i$ (=$y_{ei}$-$y_{fi}$) is deduced from one neural oscillator model and an output thereof is fed back to a needed part. In the present invention, the feedback of the first neural oscillator model 300 is fed back to the platform model 100 and the second neural oscillator model 400 and the feedback of the second neural oscillator model 400 is fed back to the suspension model 200 and the first neural oscillator model 300.

That is, the displacement $x_t$ of the platform model 100 is inputted into the first neural oscillator model 300, the feedback $x_{o1}$ of the first neural oscillator model 300 and the displacement $x_s$ of the suspension model 200 are inputted into the second neural oscillator model 400, and the pressing force $k_{o2xo2}$ required for the suspension of the vehicle can be acquired from the feedback $x_{o2}$ of the second neural oscillator model 400.

Further, the feedback $x_{o2}$ of the second neural oscillator model 400 can be inputted into the first neural oscillator model 300 together with the displacement $x_t$ of the platform model 100.

FIG. 2 is a flowchart of a method for controlling a suspension for a vehicle according to an exemplary embodiment of the present invention. The method for controlling a suspension for a vehicle according to the exemplary embodiment of the present invention can include a displacement process (S100) of acquiring displacements of a platform model and a suspension model from displacements inputted from the platform model and the suspension model expressed by virtual mass-spring-damper models into a tire; a first input process (S200) of inputting the displacement of the platform model into a first neural oscillator model that feeds back an output to the platform model; a second input process (S300) of inputting the feedback of the first neural oscillator model and the displacement of the suspension model to a second neural oscillator model that feeds back the output to the suspension model; and a deduction process (S400) of acquiring pressing force required for the suspension of the vehicle from the feedback of the second neural oscillator model.

Further, the deduction process can further include an inter-input process (S500) of inputting the feedback of the second neural oscillator model into the first neural oscillator model together with the displacement of the platform model.

That is, according to time sequencing, first, excitation A sin(wt) generated by a road surface is transferred to the platform model 100 and the suspension model 200. In this case, the displacements $x_t$ and $x_s$ of the platform model 100 and the suspension model 200 are deduced through Equations 1 and 2 above. The deduced displacements are inputted into the first neural oscillator model 300 and the second neural oscillator model 400, respectively.

The respective neural oscillator models deduce the feedbacks $x_{o1}$ and $x_{o2}$ through Equation 3 and the deduced feedbacks are substituted into Equations 1 and 2 again and simultaneously, deduced as the pressing force $k_{o2xo2}$ of the suspension model 200. Meanwhile, the feedbacks of both neural oscillator models are simultaneously substituted into Equation 3 to mutually refer to each other to thereby be networked to each other. A result of the mutually referred networking has an advantage in that a selection range of an amplitude can be designed to be wider while controlling the finally deduced feedback of the second neural oscillator model to be included in the amplitude of a desired range.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which can be included within the spirit and scope of the invention as defined by the appended claims.

For example, although various aspects of the invention are in the context of a single unit or a plurality of units, it is understood that the invention can also be performed by a plurality of units or a single unit, respectively.

Furthermore, the control logic of the present invention can be embodied as non-transitory computer-readable media on a computer-readable medium containing executable program instructions executed by a processor, controller or the like. Examples of computer-readable media include, but are not limited to, ROM, RAM, compact disc (CD)-ROMs, magnetic tapes, floppy disks, flash drives, smart cards and optical data storage devices. The computer-readable recording medium can also be distributed in network coupled computer systems so that the computer-readable media is stored and executed in a distributed fashion, e.g., by a telematics server or a Controller Area Network (CAN).

What is claimed is:

1. A system for controlling a suspension for a vehicle, the system comprising:
a controller programmed to implement:
a platform model;
a suspension model;
a first neural oscillator model; and
a second neural oscillator model;
wherein the platform model and the suspension model are expressed by virtual mass-spring-damper models;
wherein the first neural oscillator model and the second neural oscillator model feed back an output to each model to:
acquire displacements of the platform model and the suspension model from displacements inputted into a tire;
acquire feedbacks of the first neural oscillator model and the second neural oscillator model from the displacements of the platform model and the suspension model; and
acquire pressing force required in the suspension for the vehicle from the feedback of the second neural oscillator model,
wherein each of the first neural oscillator model and the second neural oscillator model feeds back a cyclic signal by an extensor neuron and a flexor neuron in accordance with equations $$T_r \dot{x}_{ei} + x_{ei} = -w_{fi} y_{fi} - \sum_{j=1}^{n} w_{ij} y_j - b v_{ei} - \sum k_i [g_i]^+ + s_i$$

$$T_a \dot{v}_{ei} + v_{ei} = y_{ei} \quad y_{ei} = [x_{ei}]^+ = \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+ = \max(x_{fi}, 0),$$

where $T_r$ and $T_a$ represent time constants $w_f$, $w_e$, and $w_i$, represent suppressor gains, b represents an adaptation constant, $g_i$ represents an input displacement, $S_i$ represents an external stimulus input, and $k_i$ represents a feedback gain.

2. The system for controlling a suspension for a vehicle of claim 1, wherein the platform model is expressed by equation $$m_t \ddot{x}_t + c_t \dot{x}_t + (k_t + k_c) x_t - k_c x_s = k_{o1} x_{o1}$$

and the suspension model is expressed by equation $$m_s \ddot{x}_s + c_s \dot{x}_s + k_c x_t - (k_s + k_c) x_s = k_{o2} x_{o2}$$

where $m_t$, $c_t$, $k_t$, and $x_t$ represent mass, a damping coefficient, a spring constant, and a displacement of the platform model, respectively, $m_s$, $c_s$, $k_s$, and $x_s$ represent mass, a damping coefficient, a spring constant, and a displacement of the suspension model, respectively, $x_{o1}$ and $x_{o2}$ represent feedbacks of the first neural oscillator model and the second neural oscillator model, respectively, and $k_{o1}$, $k_{o2}$, and k represent predetermined coefficients for expressing the displacements as force.

3. The system for controlling a suspension for a vehicle of claim 1, wherein the displacement of the platform model is inputted into the first neural oscillator model, the feedback of the first neural oscillator model and the displacement of the suspension model are inputted into the second neural oscillator model, and the pressing force required for the suspension of the vehicle is acquired from the feedback of the second neural oscillator model.

4. The system for controlling a suspension for a vehicle of claim 3, wherein the feedback of the second neural oscillator model is inputted into the first neural oscillator model together with the displacement of the platform model.

5. A method for controlling a suspension for a vehicle, the method comprising:
acquiring displacements of a platform model and a suspension model from displacements inputted from the platform model with use of a controller and the suspension model expressed by virtual mass-spring-damper models into a tire;
inputting the displacement of the platform model into a first neural oscillator model with use of the controller that feeds back an output to the platform model;
inputting the feedback of the first neural oscillator model and the displacement of the suspension model to a second neural oscillator model that feeds back the output to the suspension model with use of the controller; and
acquiring pressing force required for the suspension of the vehicle from the feedback of the second neural oscillator model,
wherein each of the first neural oscillator model and the second neural oscillator model feeds back a cyclic signal by an extensor neuron and a flexor neuron in accordance with equations $$T_r \dot{x}_{ei} + x_{ei} = -w_{fi} y_{fi} - \sum_{j=1}^{n} w_{ij} y_j - b v_{ei} - \sum k_i [g_i]^+ + s_i$$

$$T_a \dot{v}_{ei} + v_{ei} = y_{ei} \quad y_{ei} = [x_{ei}]^+ = \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+ = \max(x_{fi}, 0),$$

where $T_r$ and $T_a$ represent time constants $w_f$, $w_e$, and $w_i$ represent suppressor gains, b represents an adaptation constant, $g_i$ represents an input displacement, $S_i$ represents an external stimulus input and $k_i$ represents a feedback gain.

6. The method for controlling a suspension for a vehicle of claim 5, wherein the step of acquiring pressing force further includes inputting the feedback of the second neural oscillator model into the first neural oscillator model together with the displacement of the platform model.

7. A non-transitory computer readable medium containing program instructions executed by a processor or controller, the computer readable medium comprising:
program instructions that acquire displacements of a platform model and a suspension model from displacements inputted from the platform model and the suspension model expressed by virtual mass-spring-damper models into a tire;
program instructions that input the displacement of the platform model into a first neural oscillator model that feeds back an output to the platform model;
program instructions that input the feedback of the first neural oscillator model and the displacement of the suspension model to a second neural oscillator model that feeds back the output to the suspension model; and program instructions that acquire pressing force required for the suspension of the vehicle from the feedback of the second neural oscillator model, wherein each of the first neural oscillator model and the second neural oscillator model feeds back a cyclic signal by an extensor neuron and a flexor neuron in accordance with equations $$T_r \dot{x}_{ei} + x_{ei} = -w_{fi} y_{fi} - \sum_{j=1}^{n} w_{ij} y_j - b v_{ei} - \sum k_i [g_i]^+ + s_i$$

$$T_a \dot{v}_{ei} + v_{ei} = y_{ei} \quad y_{ei} = [x_{ei}]^+ = \max(x_{ei}, 0)$$

$$T_r \dot{x}_{fi} + x_{fi} = -w_{ei} y_{ei} - \sum_{j=1}^{n} w_{ij} y_j - b v_{fi} - \sum k_i [g_i]^- + s_i$$

$$T_a \dot{v}_{fi} + v_{fi} = y_{fi} \quad y_{fi} = [x_{fi}]^+ = \max(x_{fi}, 0),$$

where $T_r$ and $T_a$ represent time constants $w_f$, $w_e$, and $w_i$ represent suppressor gains, b represents an adaptation constant, $g_i$ represents an input displacement, $S_i$ represents an external stimulus input and $k_i$ represents a feedback gain.

* * * * *